United States Patent
Speek et al.

(10) Patent No.: US 9,471,546 B2
(45) Date of Patent: Oct. 18, 2016

(54) SYSTEM FOR GENERATING RECONFIGURABLE WEB APPLICATION

(71) Applicant: Silver Solutions B.V., Rijswijk (NL)

(72) Inventors: Adrianus Johannes Rudolf Speek, Rijswijk (NL); Julio Harvey Westerborg, Rijswijk (NL)

(73) Assignee: SILVER SOLUTIONS B.V. (NL)

( * ) Notice: Subject to any disclaimer, the term of this patent is extended or adjusted under 35 U.S.C. 154(b) by 678 days.

(21) Appl. No.: 13/668,606

(22) Filed: Nov. 5, 2012

(65) Prior Publication Data

US 2013/0332818 A1  Dec. 12, 2013

(30) Foreign Application Priority Data

Jun. 6, 2012 (EP) .................................... 12171031

(51) Int. Cl.
G06F 17/00 (2006.01)
G06F 17/20 (2006.01)
G06F 9/445 (2006.01)
G06F 9/44 (2006.01)

(52) U.S. Cl.
CPC .......... *G06F 17/20* (2013.01); *G06F 9/44505* (2013.01); *G06F 8/38* (2013.01)

(58) Field of Classification Search
CPC ........................ G06F 9/45504; G06F 9/45529
USPC ........................................................ 715/221
See application file for complete search history.

(56) References Cited

U.S. PATENT DOCUMENTS 6,766,298 B1 *  7/2004  Dodrill et al. ............. 704/270.1

OTHER PUBLICATIONS

Rouse, Margaret "CRUD cycle (Create, Read, Update, and Delete Cycle)," May 10, 2010 available at: https://web.archive.org/web/20100510235740/http://searchdatamanagement.techtarget.com/definition/CRUD-cycle.*
Microsoft, "Generating XML Instances," Nov. 7, 2008 available at: https://web.archive.org/web/20081107235132/http://msdn.microsoft.com/en-us/library/ms190965.aspx.*

* cited by examiner

*Primary Examiner* — Shawn S Joseph
(74) *Attorney, Agent, or Firm* — Kaplan Breyer Schwarz & Ottesen, LLP

(57) ABSTRACT

A system for generating an On-Demand reconfigurable Web application that provides create/read/update/delete-functionality on data managed in one or more external data sources. An XML-based definition is accessed to learn of desired create/read/update/delete-functionality in pre-defined form, graphical interfaces (GUIs) on functionality, non-typed definitions of data in the data sources, as well as data logic related to the data sources and the various relationships between these items. Upon request the definition is parsed and one of the GUIs is presented or some of the defined functionality is executed. An abstraction layer is used to obtain access to the data managed in the external data sources and On-Demand-Instantiation is applied to type the non-typed objects within the context of the definition of the functionality being executed.

6 Claims, 5 Drawing Sheets

SYSTEM FOR GENERATING RECONFIGURABLE WEB APPLICATION

CROSS-REFERENCE TO RELATED APPLICATIONS

This application claims the benefit of EP provisional application number 12171031.3, filed on Jun. 6, 2012, which is incorporated herein by reference.

FIELD OF THE INVENTION

The invention relates to a system for generating an On-Demand reconfigurable Web application that provides create/read/update/delete-functionality on data managed in one or more external data sources.

The invention further relates to a computer program product comprising executable code for causing a computer to operate as the system of the invention.

BACKGROUND OF THE INVENTION

In software engineering, multi-tier architecture (often referred to as n-tier architecture) is a client-server architecture in which the presentation, the application processing, and the data management are logically separate processes. For example, an application that uses middleware to service data requests between a user and a database employs multi-tier architecture. The most widespread use of multi-tier architecture is the three-tier architecture.

Three-tier is a client-server architecture in which the user interface, functional process logic ("business rules"), computer data storage and data access are developed and maintained as independent modules, most often on separate platforms. It was developed by John J. Donovan in Open Environment Corporation (OEC), a tools company he founded in Cambridge, Mass. A schematic model of three-tier architecture is shown in FIG. 1.

The three-tier model is a software architecture and a software design pattern. Apart from the usual advantages of modular software with well-defined interfaces, the three-tier architecture is intended to allow any of the three tiers to be upgraded or replaced independently in response to changes in requirements or technology. For example, a change of operating system in the presentation tier would only affect the user interface code.

Typically, the user interface runs on a desktop PC or workstation and uses a standard graphical user interface, functional process logic may consist of one or more separate modules running on a workstation or application server, and an RDBMS on a database server or mainframe contains the computer data storage logic. The middle tier may be multi-tiered itself (in which case the overall architecture is called an "n-tier architecture").

Three-tier architecture has the following three tiers:
Presentation tier. This is the topmost level of the application. The presentation tier displays information related to such services as browsing merchandise, purchasing, and shopping cart contents. It communicates with other tiers by outputting results to the browser/client tier and all other tiers in the network.
Application tier (business logic, logic tier, data access tier, or middle tier). The logic tier is pulled out from the presentation tier and, as its own layer, it controls an application's functionality by performing detailed processing.
Data tier. This tier consists of database servers. Here information is stored and retrieved. This tier keeps data neutral and independent from application servers or business logic. Giving data on its own tier also improves scalability and performance.

Whereas the architecture of the application consists of three tiers, the application itself consists of two parts: executable code and data storage. The executable code comprises the actual code which could be either compiled source-code installed as executables, or script code that is parsed during run-time. The data storage comprises the database that contains the actual data.

The executable code obvious purpose is to build the GUI for the application. The data-storage is obviously used to store the actual data. Data- and/or Business-logic can either be included in the executable code (mainly Business-Logic) or the database (Data-logic).

This approach has various disadvantages. For example, after changes being made to the application, the application has to be re-distributed as a new version. While the executables or script-code usually belongs together, complete sets of code should be kept together for each version. When customization to the application is done, the distribution becomes even more difficult, especially when customization is done by multiple development parties. Further, each customization can only be delivered once it is completed, if not to complicate the distribution even more. In-between delivery to evaluate the results can not be done.

Various systems exist that strive to address this situation in one way or another. For example, OpenRules available at <http://openrules.com/> is a Business Decision Management System oriented to subject matter experts allowing them to create, test, and maintain enterprise-class decision support applications. RuleLab.net at <http://www.rulelab.net/> offers a Web-based system for designing and implementing the business rules that operate on an application's XML data. The article 'Complex Business Rules on your ASP.NET Website in Several Minutes' by The Code Project at <http://www.codeproject.com/Articles/220699/Complex-business-rules-on-your-ASP-NET-website-in> provides a basic ASP.NET program that allows a programmer to change business rules without having to recompile the entire code base.

U.S. Pat. No. 6,766,298 provides a unified web-based voice messaging system with a voice application control between a web browser and an application server via an hypertext transport protocol (HTTP) connection on an Internet Protocol (IP) network. The web browser receives an HTML page from the application server having an XML element that defines data for an audio operation to be performed by an executable audio resource. The application server executes the voice-enabled web application by run-time execution of extensible markup language (XML) documents that define the voice-enabled web application to be executed. The application server, in response to receiving a user request from a user, accesses a selected XML page that defines at least a part of the voice application to be executed for the user. The application server then parses the XML page, and executes the operation describer by the XML page.

US 2006/0048097 discloses a system and method for developing web services that includes three frameworks: a Design Time Framework, an Object-Service Framework, and a Run Time Framework. In the Design Time Framework, the system and method includes receiving a schema in a descriptive markup language from a user and generating source code artifacts in an object oriented programming language based on the schema. In the Object-Service Framework, the system and method includes relating the generated source code artifacts to a set of pre-built runtime services. Finally, in a Run Time Framework, the system and method includes providing the set of runtime services, wherein the runtime services interact with the generated source code artifacts through the relationship defined by the Object-Service Framework.

US20120089933 discloses a digital content authoring tool for authoring digital content, including animation, without the need to understand or access computer code. Each animation can be controlled by an action, and the actions can be tied to a time axis for execution. By relating actions to a time axis, animations based on the actions can be more easily viewed and reviewed.

None of the discussed disclosures adequately address all needs in the market, usually because they are limited to the User Interface or Business Logic and therefore do not target the mismatch with the three-tier model, or rely on other (third party) components. There thus is a need for an improved system for generating an On-Demand reconfigurable Web application that provides create/read/update/delete-functionality on data managed in one or more external data sources.

SUMMARY OF THE INVENTION

The invention provides a system as claimed in claim 1. This system advantageously and surprisingly uses a general stand-alone software application with code for providing the desired functionality. A key aspect is that the stand-alone software application contains nothing more than a set of data read/write components to various domains (eg. open database connection, xmlHTTP web-service) and a set of abstract GUI components like buttons, browsers, calendars, lists etcetera.

An XML-based definition is accessed to learn of desired create/read/update/delete-functionality in pre-defined form, graphical interfaces on functionality, non-typed definitions of data in the data sources, as well as data logic related to the data sources and the various relationships between these items.

Further, upon receipt of a request to have the Web application perform an action, the stand-alone software application parses the XML-based definition, presents one or more of the defined graphical interfaces and/or executes the functionality from the XML-based definition that is associated with the action, using the abstraction layer to obtain access to the data managed in the external data sources and applying On-Demand-Instantiation to type the non-typed objects within the context of the definition of the functionality being executed.

The XML-based definition thus serves as a repository that contains all the information for the data read/write components to fetch data from the various data-sources and do validated updates accordingly. The repository also contains the information on the functionality that is available in the application, whereas functionality is limited here to the business-logic for creating and updating data. Last but not least, the repository should contain information on how data belongs together and how the data including the related data within a specific context should be presented in the GUI.

In accordance with the invention, the software application itself is nothing more but a placeholder where the XML-based repository provides the context and content. Each instance of the software application can be completely redefined by configuring the repository. If the system is connected to the internet, the XML Repository can be accessed through a Uniform Resource Locator (URL) so no physical distribution is necessary. The only thing that should be distributed if no internet connection is available is the repository. The actions in the repository may relate to one or more of: (1) a predefined update for the XML Repository that describes how the properties of the entity itself should be updated, (2) a predefined update for the XML Repository that describes how properties from the entity should be used to create or update other entities, (3) a method that specifies how default values to be used in aforementioned (1) and (2) should dynamically be generated and be made available, or (4) any other action.

By using data from existing applications as a base for the solution, instead of building from scratch, a more stable and reliable solution can be provided for the end user. By using generally accepted and known software applications, the solution can be adopted easily by the end user without the need for additional knowledge. Also, the solution can be implemented and supported by many suppliers. By using best practices from existing configurations as the basis for a roll out, the implementation time can be limited. By making use of the standard application functionality from the components instead of creating new functionality, these applications can be used to the fullest and further implemented if required without the risk of conflicting functionality.

Care should be taken to address potential object-relational impedance mismatch. The object-relational impedance mismatch is a set of conceptual and technical difficulties that are often encountered when a relational database management system (RDBMS) is being used by a program written in an object-oriented programming language or style; particularly when objects or class definitions are mapped in a straight-forward way to database tables or relational schemata.

Object-oriented programs are designed with techniques that result in encapsulated objects whose representation is hidden. Mapping such private object representation to database tables makes such databases fragile according to OOP (object-oriented programming) philosophy, since there are significantly fewer constraints for design of encapsulated private representation of objects compared to a database's use of public data, which must be amenable to upgrade, inspection and queries.

A major mismatch between existing relational and OO languages is the type system differences. The relational model strictly prohibits by-reference attributes (or pointers), whereas OO languages embrace and expect by-reference behavior. Scalar types and their operator semantics are also very often subtly to vastly different between the models, causing problems in mapping.

To address this issue, the framework should be designed to do the On-Demand translation of the non-typed information from the repository to typed classes that are inserted in the running application.

To improve data integrity, an access operation to the data managed in one of the external data sources that involves writing is preferably provided with a rollback mechanism. This mechanism should restore data in previously updated data sources to its original state if the create/update fails in a proceeding step and the transaction cannot be completed.

The invention provides a fully functional web-application that covers all the tiers from the three-tier client-server architecture, without the need of or dependency on additional plug-ins or third-party extensions. The standalone software application itself is an empty application that serves as a framework.

In an embodiment the XML-based definition comprises a version number and the parser determines from the version number whether to reuse a previously parsed instance of the XML-based definition or to parse the XML-based definition anew. This allows an easy determination if a reload is necessary, saving computation time.

The invention further provides for a computer-readable storage medium comprising executable code for causing a computer to operate as the system of the invention.

BRIEF DESCRIPTION OF THE FIGURES

The invention will now be explained in more detail with reference to the figures, in which.

In the figures, same reference numbers indicate same or similar features. In cases where plural identical features, objects or items are shown, reference numerals are provided only for a representative sample so as to not affect clarity of the figures.

DETAILED DESCRIPTION

Section: System Overview

Figure 1:
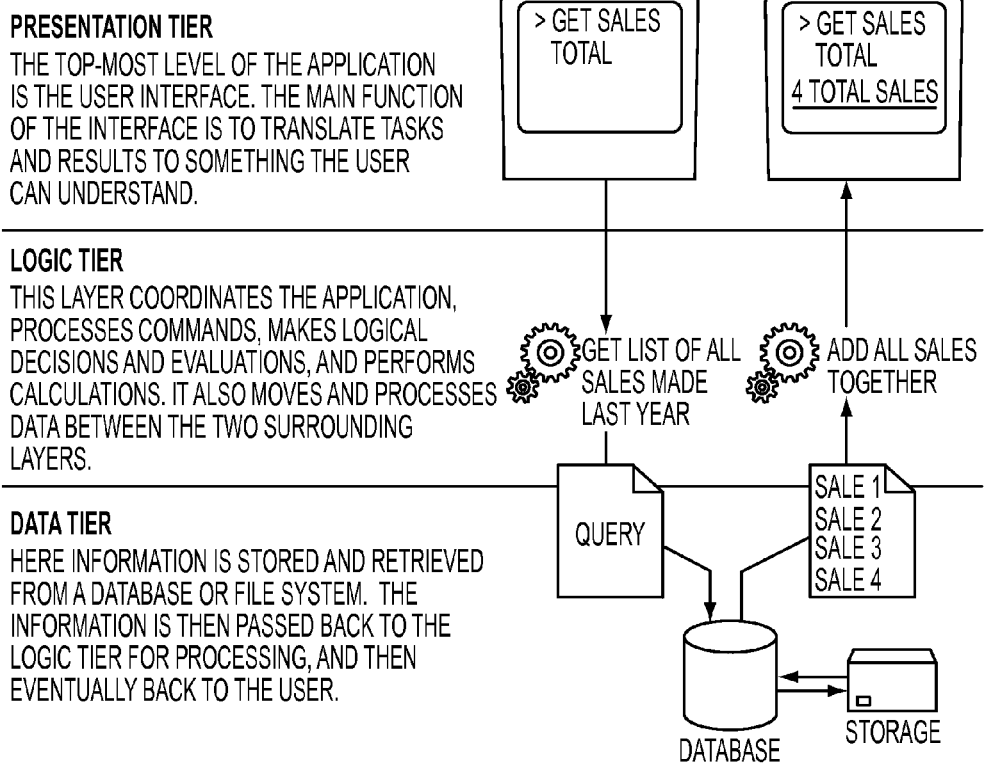
FIG. 1 illustrates a three-tier architecture.
Figure 2:
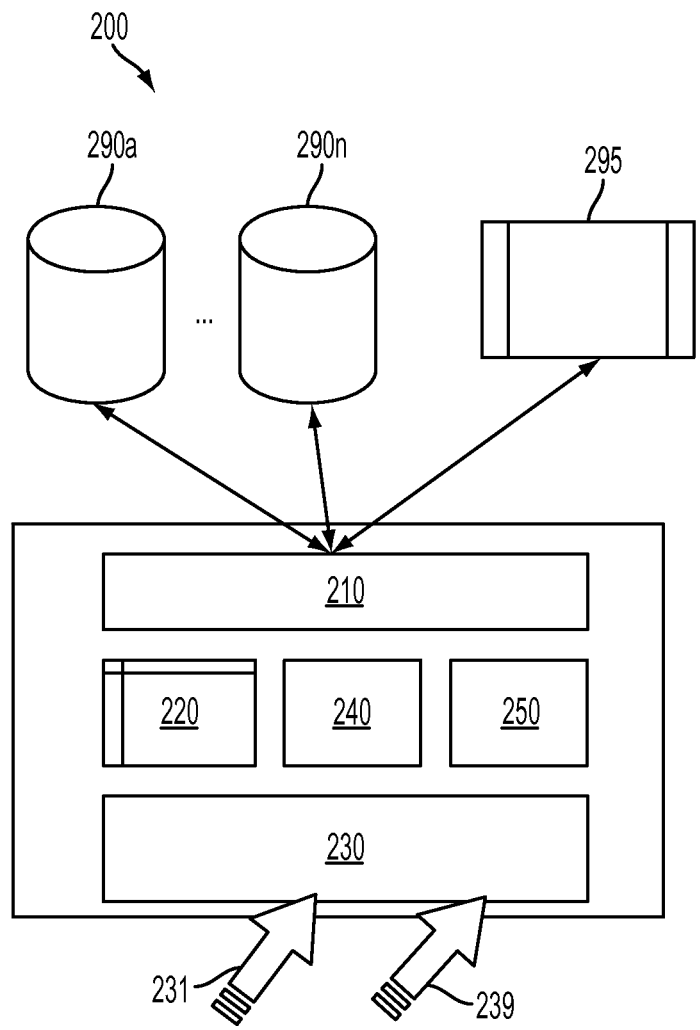
FIG. 2 schematically shows the major components of a system in accordance with the invention.

FIG. 2 schematically shows the major components of a system 200 in accordance with the invention, which system 200 is designed for generating a reconfigurable Web application that provides create/read/update/delete-functionality on data managed in one or more external data sources 290*a*, ..., 290*n*. To this end, the system 200 comprises a general stand-alone software application with the following modules:

1. an abstraction layer 210 to the external data sources and to one or more computation services 295;
2. an XML access module 220 for accessing an XML-based definition 225 of desired create/read/update/delete-functionality in pre-defined form, graphical interfaces on functionality and non-typed definitions of data in the data sources, data logic related to the data sources and the various relationships between these items;
3. a communication module 230 for receiving 231 a request to have the Web application perform an action, for triggering the XML parser 240 and the processing module 250 and for returning 239 the output of the processing module 250;
4. an XML parser 240 for parsing the XML-based definition; and
5. a processing module 250 for presenting one or more of the defined graphical interfaces and/or executing the functionality from the XML-based definition that is associated with the action, using the abstraction layer 210 to obtain access to the data managed in the external data sources 295 and applying On-Demand-Instantiation to type the non-typed objects within the context of the definition of the functionality being executed.

The reconfigurable Web application is a Web application generated by the GUI components as described in the section on User Interface Components below. The create/read/update/delete- or CRUD-functionality is provided preferably via user input in the BusinessEntityEditor as described in the section on User Interface Components, or as predefined updates through the ExtendedMethods or CopyActions as described in the section on the XML Repository.

The standalone software application framework contains both the User Interface Components and CRUD Components through which the application is built, by loading the configuration from the XML Repository. Note that the XML Repository is a static file that cannot be typed as such, hence the provision of non-typed definitions of data in the data sources 290*a*, ..., 290*n*.

The graphical interfaces on functionality are implemented by providing the placeholder components for the GUI as is described in the section on User Interface Components.

Data logic related to the data sources and the various relationships between these items is implemented in the BusinessEntity in the XML Repository that can contain multiple data-sources, and in the SilverBusinessEntity where lists of related data are linked to the main BusinessEntity.

The action requested for the Web application can either build a GUI as described in the section on the User Interface Components, or provide data updates as described in the section on CRUD Actions. Other actions are of course also possible. Building the GUI is implemented by adding the dynamically created classes within the placeholder components for the GUI as is described in the section on User Interface Components. Executing the functionality from the XML-based definition that is associated with the action is as described in the section on CRUD Actions.

The abstraction layer is used to obtain access to the data managed in the external data sources through the identifiers as configured in the XML Repository, executed by the CRUD components as described in the corresponding sections.

On-Demand-Instantiation is applied to type the non-typed objects within the context of the definition of the functionality being executed. This is implemented in the software application's CRUD components as described in the corresponding section.

By default, the standalone software application can be described as an empty application. Unlike other applications, the standalone software application is generated on-demand by user request. What's more, the software application has no predefined data-source from which the data can be read and to which the data can be written. How to connect to one or more data-sources is defined in the XML Repository.

Further, whereas a typical CRM application would have entities such as Customers and Prospects, the standalone software application does not come with predefined entities. Instead, entities as such are defined in the XML Repository. This means a virtually unlimited number of entities can be added. And whereas a CRM application would have functionality such as blocking Customers or approving Sales Orders, the standalone software application does not come with predefined functionality.

Instead, functionality as such is defined in the XML Repository. Functionality is always related to a specific entity and what can be configured is how data should be updated. This comes down to 2 areas of functionality:

1. ExtendedMethods. These are predefined updates that can be configured for the XML Repository that describe how the properties of the entity itself should be updated.
2. CopyActions. These are predefined updates that can be configured for the XML Repository that describe how properties from the entity should be used to create or update other entities. This could be either an entity of the same kind (eg. Customer to Customer) or a different entity (e.g. Customer to Sales Order) from the XML Repository.

Since the standalone software application itself contains no entities nor functionality, the security context for these is also not standard. The security context itself is configured in the XML Repository.

Figure 3:
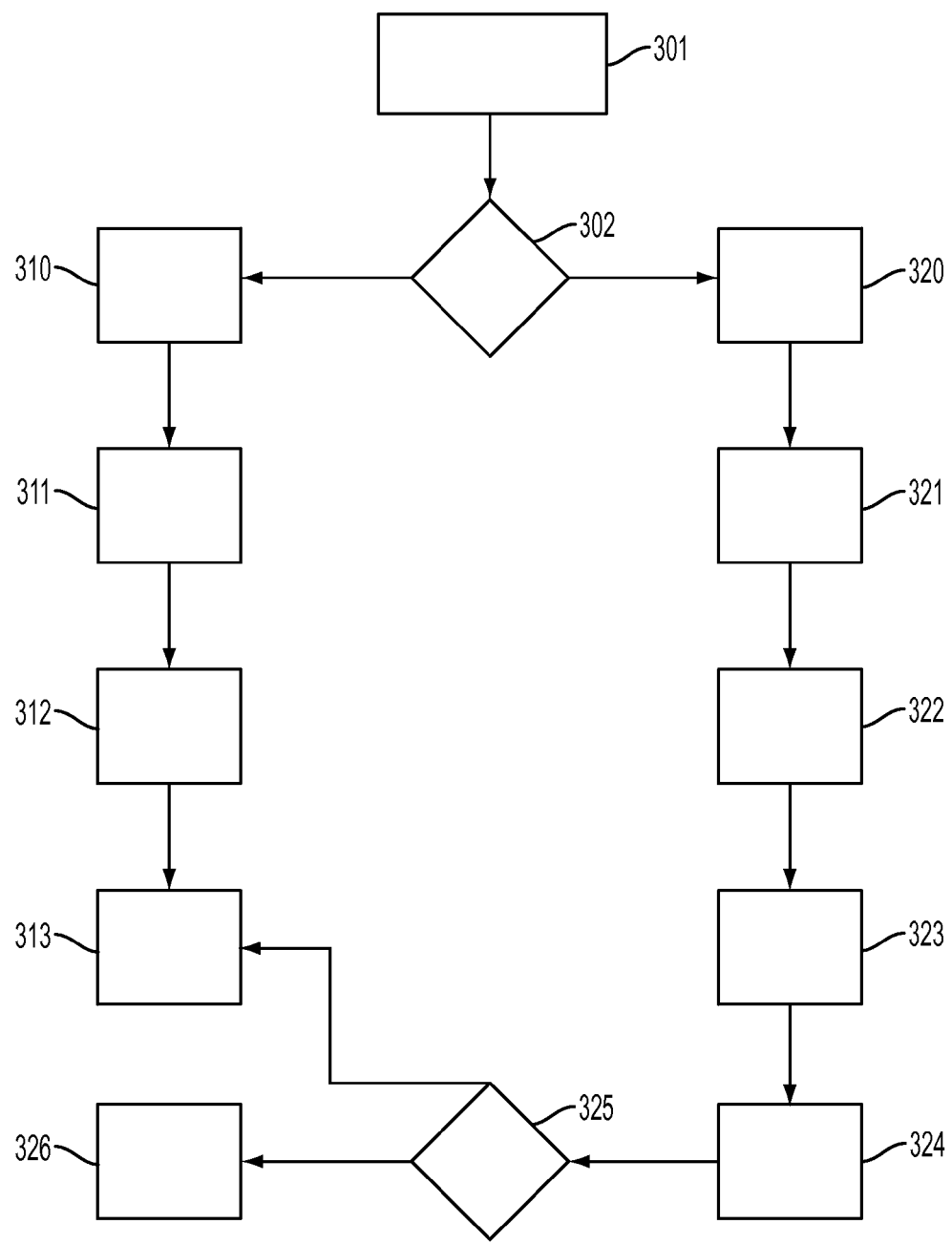
FIG. 3 shows a flowchart of the System Concept & Loading Behavior of the software application of a preferred embodiment of the invention.

FIG. 3 shows a flowchart of the System Concept & Loading Behavior of the software application of a preferred embodiment of the invention.

In step 301, a user request is received to have the Web application perform an action. The request is evaluated in step 302 to determine if a read or write action is desired. If reading, the method proceeds to step 310 where an appropriate BusinessController is started. The XML Repository is parsed and a configuration is loaded in step 311. The necessary classes are constructed On-Demand and inserted into the framework in step 312. The GUI of the application is built on-demand by parsing the XML Repository in step 313. This GUI comprises the data that was requested for reading.

If a write action is desired, as determined in step 302, the method instead proceeds to step 320 where an appropriate BusinessController is started. The XML Repository is parsed and a configuration is loaded in step 321. The necessary classes are constructed On-Demand and inserted into the framework in step 322. Data is updated in step 323 in accordance with the specifics of the write action comprised in the user request.

Any errors that may occur (e.g. insufficient permissions, data is locked) during writing are collected in step 324 and passed to an error handler, which in step 325 determines if a user action or a Web service call in XML format is necessary. User action is requested by proceeding to step 312 where appropriate classes are constructed and a GUI is built next in step 313 to solicit the user action. If a Web service call in XML format is necessary, an appropriate XML message is generated and sent in step 326.

Section: XML Repository

The XML Repository defines the look-and-feel as well as the functionality and security context of the instance of the standalone software application. The XML Repository contains all the information on:
how data should be read, depending on the data-source.
which data should be read
which data can be read, according to the security context
which data belongs together, regardless of the data comes from one or multiple datasources
how related data and functionality should be presented in the GUI
how data should be written, depending on the data-source
how updates should be canceled (rollback) in case of unavailability of one or more data-sources
which data can be updated, according to the security context
which predefined updates can be executed
how security should be applied to prevent data or functionality is available for users that should not have access to it
which stylesheets or user defined screens should be used for the layout of the GUI.

The XML Repository configures identifiers, BaseEntities, BusinessObjects, LookUps, BusinessEntities, BusinessEntityLists, the SilverBusinessEntity and the BusinessController.

Also part of the XML Repository are the CopyActions. Each CopyAction describes how the data from one BusinessEntity can be used as default values during the create or update for another BusinessEntity.

Most basic example of a CopyAction would be to copy data using the same BusinessEntity as both the source and target, but a CopyAction can also be used to copy data from one BusinessEntity to a different BusinessEntity, for example use the Debtor to create a Creditor or use a Customer to create a Sales Order.

As the source a single BusinessEntity can be used, but it's also possible to specify a BusinessEntityList as a source to create multiple data during the copy action.

Identifiers.

The identifiers contain the information to read/write data to a single data-source. If an identifier is created for a database, it should contain the connection string to that database. If an identifier is created for an xmlHTTP web-service, it should contain the URL the web-service is published. Custom domains like Exact Synergy should contain both an URL for the web-service and a connection string for the database so the fastest or most secure way of accessing data can be used, depending on the case.

BaseEntities.

A BaseEntity contains information on reading/writing a specific table (databases), topics (webservices) or specific data providers such as BusinessComponents (as used by the well-known Exact Software) within a specific identifier. The BaseEntity also describes which fields or properties should be read, which fields or properties are read-only along with the data-types for these fields or properties. Since the XML Repository is a static XML file, this is all none-typed information.

BusinessObjects.

Each BaseEntity has its own counterpart in a BusinessObject. Whereas the BaseEntity describes which data should be read and how, the BusinessObjects describes if and how data can be written. Upon creating new data, the BusinessObject however is also used to retrieve default from the database or web-service.

LookUps.

A LookUp is a basic configuration for a list that is to be used to make a selection from existing data. It refers to a specific table or view from a database, or a topic from a Web service. A LookUp is a basic list that will show only 2 columns, in general for such as code and description.

BusinessEntities.

Whereas the BaseEntity is used to configure the read/write part of the application, the BusinessEntity is used to configure the Business Logic functionality and GUI presentation. Each BusinessEntity contains at least one BaseEntity, but in many cases multiple BaseEntities will be used within one BusinessEntity.

The BusinessEntity configuration is build up from the following collections: (1) BusinessEntity: Composition, (2) BusinessEntity: Properties, (3) BusinessEntity: Methods, (4) BusinessEntity: Security. Each of these is discussed in more detail below.

(1) BusinessEntity: Composition.

A BusinessEntity can be a Single Entity that contains just one BaseEntity. It can also be a Synched Entity which contains a number of BaseEntities. With the Synched Entity, a number of characteristics are configured in the XML Repository:

SyncMasterProperties. If more than one BaseEntity is contained in the BusinessEntity, the relation between these BaseEntities must configured. By mapping properties of the Synched BaseEntities to the Main BaseEntity, these relations can be defined.

When retrieving data, the BusinessController will determine (by evaluating the identifiers of the BaseEntities involved) the best way to read the data. If all the BaseEntities use the same identifier and the data-source from the identifier uses a database-connection, a SQL Query using inner joins to multiple tables will be constructed to fetch the data in one single call.

CRUD Behavior. When data is entered (created) using a BusinessEntity that contains multiple BaseEntities, the configuration is used to determine which action should be taken. The main BaseEntity will always be created, but the Synched BaseEntities may vary in this behavior:

Behavior: Create. A new record will be created for this BaseEntity upon entering new data Behavior: None. No record will be created for this BaseEntity upon entering new data Behavior: Retrieve. No record will be created for this BaseEntity upon entering new data, but once the property/properties from the Main BaseEntity used to keep these BaseEntities synched, the unique matching record will be retrieved.

Behavior: Both. This is basically the same behavior as the Retrieve behavior, but is no unique matching record is found, it will be created.

Figure 4:
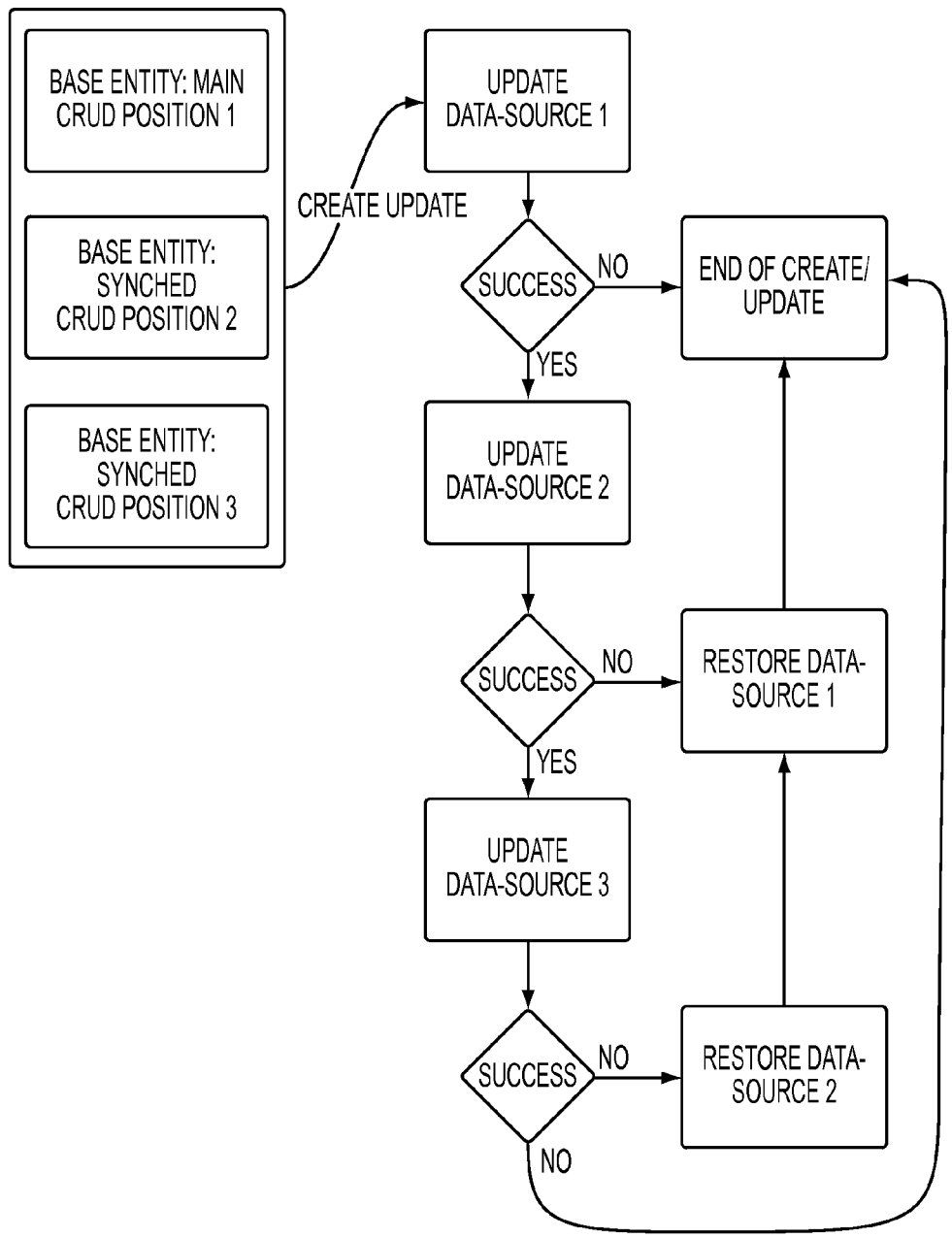
FIG. 4 illustrates behavior for an artificial rollback.

CRUD Position. Since data can come from multiple data-sources, transactional data-updates with the classic database rollback mechanism can not be used. To ensure data integrity, the BusinessEntity configuration preferably also contains the behavior for an artificial rollback, as illustrated in FIG. 4. This is done by specifying the order in which the BaseEntities within the BusinessEntity should be created/updated. If the create/update of a BaseEntity fails, the transaction can be halted and BaseEntities that already updated correctly can be restored to their previous state.

(2) BusinessEntity: Properties

Properties from the BaseEntities included in the BusinessEntity can be used, but only properties that are required within the BaseEntity itself are mandatory to be used. Each property can be styled for the GUI presentation for both viewing and editing mode, and for both single entity view or list view.

By default, all the properties are visible in the GUI presentation but this can be prevented per property. The same goes for properties being editable by the user. For both cases, properties from the user can be evaluated dynamically (eg. User should have a certain role or access level) to determine if a property is shown and/or can be edited.

Each property can have a default value that is used upon data entry or when modifying data. This value can also be generated from the application layer using a built in library of functions. User properties can be used since the function call itself is dynamically built On-Demand using the reflection technique from the .NET layer.

Since a single BaseEntity can be used as the Main BaseEntity in multiple BusinessEntities, a property having a default value can also be marked as an identifier. In that case, the default value will also be used as a filter upon the retrieval of data.

(3) BusinessEntity: Methods

To design advanced CRUD functionality, predefined updates can be configured for the BusinessEntity. This is done by configuring one or more Methods. Each method contains one or more properties to be updated and the values to be used for the update.

These values can be fixed values, or can be values that are dynamically generated through the function library of the application layer using reflection from the .NET framework.

For each method, conditions under which the method can not be run can be configured. Again, this can be done by using fixed values or dynamically generated values to be compared to the current state of the BusinessEntity. For example, a Sales Order can not be rejected if one or more lines are already shipped or payment has already been received.

(4) BusinessEntity: Security

For each BusinessEntity, security can be configured. This is done by comparing property values of the logged on user to the property values of the BusinessEntity. Security can be configured using three levels:

1. PreChecks. The first check is exclusively on the user properties using a comparison to fixed values or dynamically built function calls. In this step, no data retrieval is done. If one or more PreChecks fail, data retrieval can be blocked altogether, or data retrieval can be limited by applying filters. For example, a user should have Access Rights.

2. Filters. If the PreChecks allow the data to be retrieved, Filters can be applied. A filter can be applied using the property values of the logged on user. For example: Only documents having a Security Level below the User's Security Level should be retrieved.

3. Exceptions. If the PreChecks allow the data to be retrieved and Filters are applied, Exceptions can be specified. An Exception can be applied using the property values of the logged on user. For example, only documents having a Security Level below the User's Security Level should be retrieved, but also documents that have been created by the logged on user.

BusinessEntityList.

Whereas the BusinessEntity represents one single Entity having properties with specific values, a BusinessEntityList represents a list of these entities. A BusinessEntityList therefore always refers to a BusinessEntity. Since the GUI presentation is already configured in the referred BusinessEntity it is not possible to change this is the BusinessEntityList. What can be configured are additional filters and the default order to sort the list.

Each BusinessEntity can have multiple BusinessEntityLists. For example, the BusinessEntity User can have lists for "All Users", "Active Users" and "Inactive Users", where the last two have additional filtering on the property Active from the BusinessEntity.

SilverBusinessEntities.

In the XML Repository, the SilverBusinessEntity is used to configure how related data for a single BusinessEntity should be kept together and be presented in the GUI. Each SilverBusinessEntity contains one BusinessEntity; each BusinessEntity can be contained in multiple SilverBusinessEntities. From the BusinessEntity, related information can be derived and linked in the SilverBusinessEntity. This is done by using the BusinessEntityLists.

Since Security is applied on the BusinessEntity, the user cannot view the SilverBusinessEntity without having access to the underlying BusinessEntity.

BusinessEntityLists can be linked in the SilverBusinessEntity. To filter the LinkedList (restrict the list to show only records related to the BusinessEntity) the property values of the BusinessEntity can be used as constraints when retrieving data.

Multiple BusinessEntityLists can be linked to the BusinessEntity. To improve performance, only the first list will instantly be populated with data. If more LinkedLists are configured, the data will be retrieved upon the selection of the list in the GUI.

If at least two BusinessEntityLists are linked to the BusinessEntity, a MatrixList can be configured within the SilverBusinessEntity. This is done by specifying two lists to be presented on an X- and Y-Axis, thus creating a grid-like table. A BusinessEntity and one or more of its properties can be specified to be presented in each cell of the table, providing unique matching records can be found using the property values from the BusinessEntities presented on the X- and Y-Axis.

The table that is created from the MatrixList configuration can be set to editable in both horizontal and vertical direction.

BusinessControllers.

The BusinessController is the highest level in the configuration and is used to
1. Group multiple SilverBusinessEntities together. In this case, a one-on-one relation should exists between the main SilverBusinessEntity and the related SilverBusinessEntity. Each SilverBusinessEntity will be shown as a tab in the GUI.
2. Add functionality related to the underlying components. Functionality will be shown as buttons in the GUI.

The functionality that can be added should have been configured already elsewhere.

Each SilverBusinessEntity contains one BusinessEntity and the methods of the BusinessEntity, or BusinessEntities if multiple SilverBusinessEntities are included in the BusinessController, can be used to create ExtendedMethods. An ExtendedMethod is a sequence of Methods derived from the underlying BusinessEntities in the BusinessController. Methods from the BusinessEntities that are not included in an ExtendedMethod will not be available in the BusinessController.

Section: User Interface Components

Figure 5:
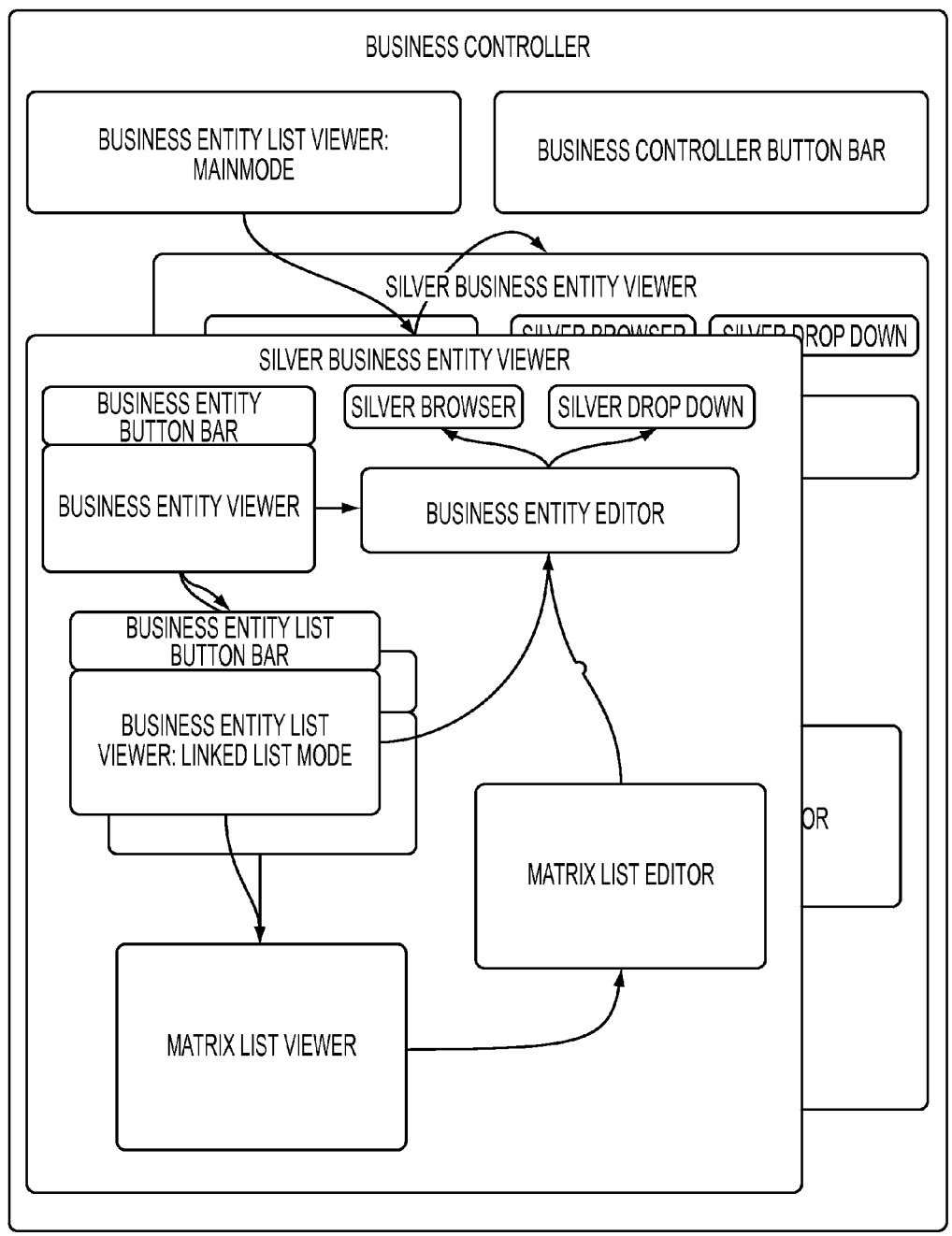
FIG. 5 schematically illustrates the overall structure of a BusinessController component of the invention.

Once the XML Repository file is parsed, the configuration is rendered through the user interface components to build the GUI accordingly. The overall structure of the BusinessController is displayed in FIG. 5.

The following components are built through the information as supplied in the configuration:

BusinessControllerPage: Layout

BusinessControllerPage: Layout.

The standalone software Web-application which presents the user interface consists of a single page. The page needs to be accessed providing a name for a BusinessController that is defined in the XML Repository for the application. From the definition of that BusinessController and the underlying structure, the user interface is generated.

The BusinessControllerPage can be accessed with or without an identifier. If no identifier is supplied, the BusinessController will instantiate the BusinessEntityListViewer. The list definition to be used is derived from the XML Repository through the BusinessEntityList which is marked as the MainList in the SilverBusinessEntity marked as Main in the BusinessController.

The BusinessEntityList contains the definition from which the BusinessEntityListViewer can build the user interface. This definition contains the instructions for:

The Search Panel. This panel contains all the fields that are marked as available for searching/filtering data in the XML Repository. By default, the Search Panel is expanded for the MainList.

The List. The list shows the result set for the search action. It also contains paging functionality for larger sets of data. Data can be sorted or grouped by column according this is allowed in the XML Repository.

The BusinessEntityListViewer preferably shows a Search button by default. A Create button for new data entry is preferably also present.

Once the BusinessControllerPage is initialized with an identifier, the BusinessControllerButtonBar is generated. It shows the buttons according to the XML Repository through which the user can start the functionality as defined.

The buttons to be shown are derived from the XML Repository through the ExtendedMethods defined in the BusinessController. Shown here are the ExtendedMethods that are derived from more than one SilverBusinessEntity.

Each SilverBusinessEntityViewer represents one SilverBusinessEntity from the BusinessController as is configured in the XML Repository and is shown as a tab in the application. Within the SilverBusinessEntityViewer a set of controls is loaded.

At the top part of the SilverBusinessEntityViewer, the BusinessEntityButtonBar is shown. This section contains a set of buttons, derived from the XML Repository. The following buttons, if present in the configuration, are shown:

Refresh, Edit. The Refresh and Edit buttons are shown by default.

From the XML Repository: ExtendedMethods. The ExtendedMethods that work exclusively on the BusinessEntity in view are shown as buttons here. By clicking one of these buttons, the predefined update as configured in the XML Repository will be executed.

From the XML Repository: CopyActions. The CopyActions from the XML Repository that are configured for the BusinessEntity in view are shown as buttons here. By clicking one of these buttons, the screen for the CopyAction is shown if user input is required. If no user input is required, the CopyAction will be executed directly.

The BusinessEntityViewer shows the properties in view-mode from the BusinessEntity as is defined in the XML Repository for the main SilverBusinessEntity within the BusinessController.

The BusinessEntityEditor shows the properties in edit-mode from the BusinessEntity as is defined in the XML Repository for the main SilverBusinessEntity within the BusinessController.

For properties that contain a value that should be selected using a pop-up browser according to the configuration in the XML Repository, the SilverBrowser is used. It is populated with a list using the LookUp as specified in the configuration.

For properties that contain a value that should be selected using a drop-down list of selection values according to the configuration in the XML Repository, the SilverBrowser is used. It is populated with a list using the LookUp as specified in the configuration.

Underneath the main BusinessEntity, the LinkedLists as configured in the XML Repository are shown. On top of each list is a button bar with buttons that are instantiated from the configuration. In one embodiment these buttons may be used:

Add New. If the configurations allows new data entry from the LinkedList, a button is shown to start the BusinessEntityEditor for the BusinessEntity used in the list. The values from properties that are used to link the list to the main BusinessEntity (the filter properties) are prefilled in the BusinessEntityEditor and cannot be edited.

CopyActions. From the configuration, the CopyActions for the BusinessEntityList that is linked are presented as buttons. By clicking the button, the screen for the CopyAction is shown if user input is required. If no user input is required, the CopyAction will be executed directly.

The BusinessEntityList contains the definition from which the BusinessEntityListViewer can build the user interface. This definition contains the instructions for:

The Search Panel. This panel contains all the fields that are marked as available for searching/filtering data in the XML Repository. By default, the Search Panel is collapsed for the LinkedList. The BusinessEntityListViewer shows a Search button by default.

The List. The list shows the result set for the search action. It also contains paging functionality for larger sets of data. Data can be sorted or grouped by column according this is allowed in the XML Repository.

The MatrixListViewer builds the screen for the MatrixList from the configuration in the XML Repository. The X- and Y-axes of the matrix are populated using the BusinessEntityLists as defined in the configuration. The grid-like table that is created by the X- and Y-Axis is populated by putting the property values in each table cell from the underlying BusinessEntity that can be found for that cell using the property values from the X- and Y-Axis.

The MatrixListEditor puts on column or row of the MatrixList in edit mode. This means all the cells in the table for that column or row are now editable by the user. If a property value should be selected from existing data, the MatrixListEditor makes use of the SilverBrowser or SilverDropDown.

Section: CRUD Components

To do the read/writing of data, the create/read/update/delete- or CRUD-functionality, various CRUD components are included in the core of the standalone software application. Upon instantiation, the non-typed XML repository is parsed for the BaseEntities (read) and BusinessObjects (write) to be used, which are On-Demand translated to typed classes that are inserted in the read/write components so these placeholder components are now turned in a fully functional unique instance for the configuration.

A core component handles the read/writing of data to the data-source as configured in the XML Repository. To handle different data-sources or domains, different elements can be configured depending on the available methods. Since constructing and executing an SQL Query against a database is most often the fastest way to retrieve large sets of data, this method is preferred if available. To write data, a validation component should be used if available. The standalone software application will evaluate which options are available for read/writing data and dynamically will use the best option for the domain specified in the configuration.

In the configuration of the XML repository, each BaseEntity contains information on how data should be read/written and which specific data from the data-source is targeted. To make this possible, the configuration contains referrals to the data-table and columns in the case of an open database connection or topic-names and X-Path expressions in case of an xmlHTTP web-service. In the case of an application specific domain which is available from the standalone software application, variants to these methods of configuration are available.

The following table illustrates some examples:

| Domain | Configure | Read | Write |
| --- | --- | --- | --- |
| Open databases | Table/column | SQL Query | SQL Query |
| XmlHTTP web service | Topic/XPath | XML message | XML message |
| Exact Globe | Table/column Topic/XPath | SQL Query XML message | XML message |
| Exact Synergy | Table/column Component/property | SQL Query | BusinessComponent |

Closing Notes

The above provides a description of several useful embodiments that serve to illustrate and describe the invention. The description is not intended to be an exhaustive description of all possible ways in which the invention can be implemented or used. The skilled person will be able to think of many modifications and variations that still rely on the essential features of the invention as presented in the claims. In addition, well-known methods, procedures, components, and circuits have not been described in detail.

Some or all aspects of the invention may be implemented in a computer program product, i.e. a collection of computer program instructions stored on a computer readable storage device for execution by a computer. The instructions of the present invention may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Storage devices suitable for storing computer program instructions include all forms of non-volatile memory, including by way of example semiconductor memory devices, such as EPROM, EEPROM, and flash memory devices, magnetic disks such as the internal and external hard disk drives and removable disks, magneto-optical disks and CD-ROM disks. The computer program product can be distributed on such a storage device, or may be offered for download through HTTP, FTP or similar mechanism using a server connected to a network such as the Internet. Transmission of the computer program product by e-mail is of course also possible.

When constructing or interpreting the claims, any mention of reference signs shall not be regarded as a limitation of the claimed feature to the referenced feature or embodiment. The use of the word "comprising" in the claims does not exclude the presence of other features than claimed in a system, product or method implementing the invention. Any reference to a claim feature in the singular shall not exclude the presence of a plurality of this feature. The word "means" in a claim can refer to a single means or to plural means for providing the indicated function.

What is claimed is:

1. A computer system for generating an On-Demand reconfigurable object-oriented Web application from a Web application framework, which object-oriented Web application provides create/read/update/delete-functionality on data managed in one or more external data sources, the system comprising a processor for executing computer instructions stored on a non-transitory storage medium, the computer instructions providing code for:

a) providing an abstraction layer to the external data sources and to one or more computation services, wherein the Web application framework has no predefined connections to data sources from which the data can be read and to which the data can be written, b) providing the Web application framework comprising functionality at the level of a data tier and providing objects implementing a business logic tier, but lacking a presentation tier,
c) generating an instance of the object-oriented Web application, comprising:
   1) accessing an XML-based definition that is limited to desired create/read/update/delete-functionality in pre-defined form, said XML-based definition serving as a repository that contains all the information for generating the instance of the Web application from the Web application framework, said XML-based definition further containing representations of functionality to be executable in the Web application, which functionality is always related to a specific entity and what can be configured is how data should be updated,
   2) adding to the Web application framework the presentation tier for interfacing with elements of the data tier and the business logic tier, thereby providing graphical interfaces on functionality,
   3) typing non-typed definitions of data in the external data sources, data logic related to the external data sources and a plurality of relationships between the non-typed definitions, the data logic and the plurality of relationships; and
d) constructing the necessary classes on-demand and inserting them into the Web application framework, taking into account a security configuration applied on a BusinessEntity, which instance comprises computer-executable instructions for doing one or both of:
   presenting one or more graphical interfaces defined in said XML-based definition and comprising data requested in the request,
   executing the functionality from the XML-based definition that is associated with the action, using the abstraction layer to obtain access to data managed in the external data sources, all necessary connection information being defined in the XML-based definition, and applying On-Demand-Instantiation to type one or more non-typed objects within a context of a definition of the functionality being executed, as defined in the XML-based definition; and
e) redefining the generated instance of the Web application.

2. The computer system of claim 1, in which the action relates to one or more of: (1) a predefined update for the XML-based definition that describes how one or more properties of a given entity should be updated, (2) a predefined update for the XML-based definition that describes how properties from a given entity should be used to create or update other entities, (3) a method that specifies how default values to be used in aforementioned (1) and (2) should dynamically be generated and be made available, or (4) any other action.

3. The computer system of claim 2, in which the method (2) that describes one or more properties is accompanied by fixed values or dynamically generated values to be compared to a current state of the system for determining conditions under which the method cannot be run.

4. The system of claim 1, in which an access operation to the data managed in one of the external data sources that involves writing is provided with a rollback mechanism.

5. The computer system of claim 1, in which the XML-based definition comprises a version number and the step of parsing comprises determines from the version number whether to reuse a previously parsed instance of the XML-based definition or to parse the XML-based definition anew.

6. A tangible, non-transitory computer-readable storage medium comprising executable code for causing a computer to operate as the system of claim 1.

* * * * *